United States Patent [19]

Danner

[11] Patent Number: 5,078,867
[45] Date of Patent: Jan. 7, 1992

[54] AQUARIUM FILTER/PROTEIN SKIMMER SYSTEM

[76] Inventor: Michael Danner, 30 Glenrich Dr., St. James, N.Y. 11780

[21] Appl. No.: 524,854

[22] Filed: May 18, 1990

[51] Int. Cl.⁵ .............................................. A01K 63/04
[52] U.S. Cl. ................... 210/169; 210/221.1; 210/416.2; 119/5
[58] Field of Search .............. 210/169, 416.2, 151, 210/150, 221.2, 221.1; 119/4, 5

[56] References Cited

U.S. PATENT DOCUMENTS

| | | | |
|---|---|---|---|
| 291,721 | 9/1887 | Willinger | D23/4 |
| 291,722 | 9/1887 | Willinger | D23/4 |
| 3,640,516 | 2/1972 | Willinger | 210/169 |
| 3,965,007 | 6/1976 | Conn et al. | 210/169 |
| 4,043,914 | 8/1977 | Horvath | 210/169 |
| 4,483,769 | 11/1984 | Sherman | 210/282 |
| 4,512,885 | 5/1985 | Willinger | 210/169 |
| 4,687,494 | 8/1987 | Escobal | 210/169 |
| 4,783,258 | 11/1988 | Willinger et al. | 210/416.2 |
| 4,834,872 | 5/1989 | Overath | 210/221.2 |
| 4,844,013 | 7/1989 | de Haan et al. | 119/5 |
| 4,988,436 | 1/1991 | Cole | 210/169 |
| 5,006,230 | 4/1991 | Votava et al. | 210/169 |

OTHER PUBLICATIONS

The Marine Aquarium Refernce Systems & Invertebrates; Martin A. Moe, Jr., pp. 244-256 and 277-287.

*Primary Examiner*—Peter Hruskoci
*Assistant Examiner*—Robert James Popovics
*Attorney, Agent, or Firm*—Leonard Belkin

[57] ABSTRACT

A water filtration system for an aquarium which combines mechanical and biological filtration in a compact and economic assembly. In one embodiment, aquarium water is utilized by a pump assembly to rotate a wheel which rotates in and out of the water to promote the growth of aerobic bacteria which removes dissolved ammonia from the water. The water is also passed through a mechanical filter to provide mechanical filtration. In another embodiment, adsorptive foam separation to remove soluble waste is combined with mechanical filtration. Other embodiments include an arrangement to extend the life of a filter.

7 Claims, 6 Drawing Sheets

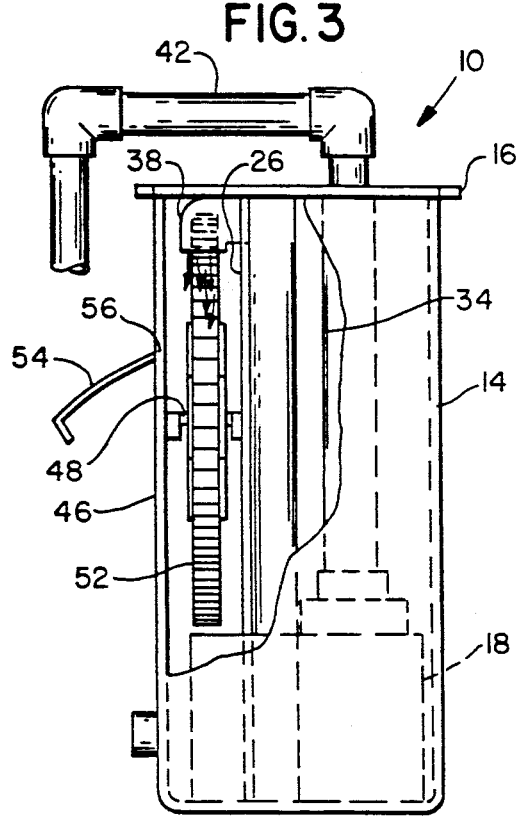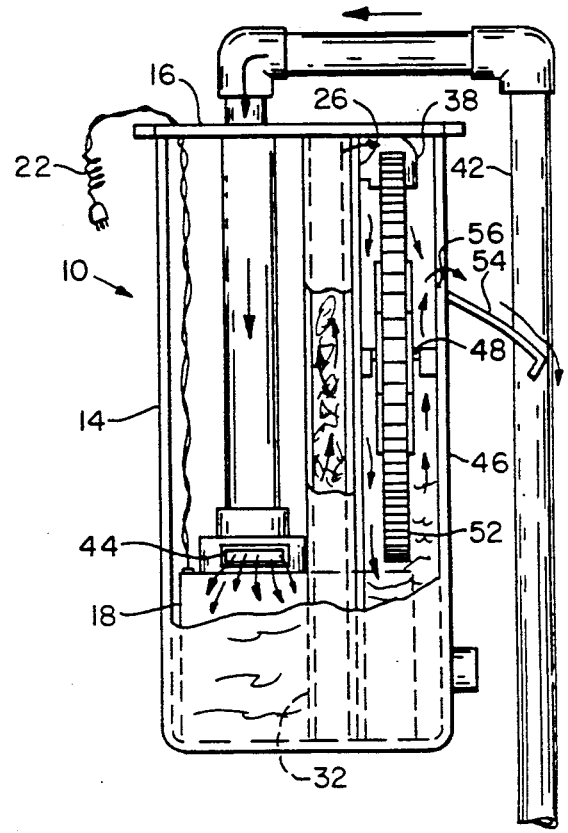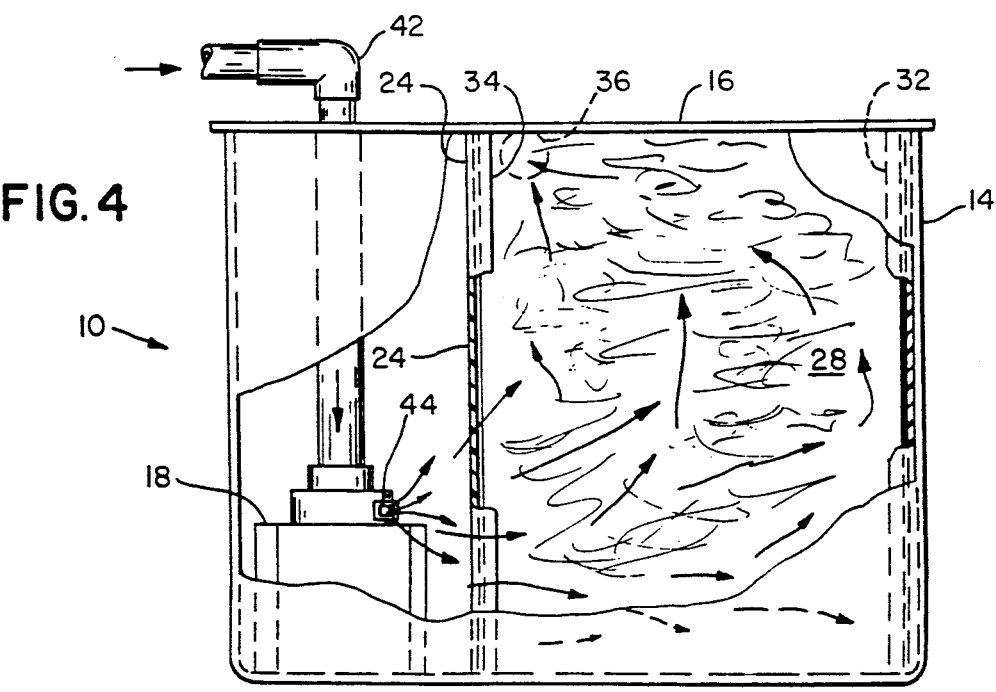

AQUARIUM FILTER/PROTEIN SKIMMER SYSTEM

BACKGROUND INVENTION

The present invention relates to water filtration systems for aquariums and more particularly to aerobic water filtration systems of improved efficiency and economy.

In a wet-dry filtration system for aquariums, a substrate is alternately wetted by the aquarium water and then exposed to air so as to encourage the growth of aerobic nitrifying bacteria which feeds on the dissolved ammonia which comes from the excretion of the fish within the aquarium.

A variety of wet-dry filtration systems have been proposed and developed, and some of these are shown in "The Marine Aquarium Reference", by Martin A. Moe, Jr., pub. Green Turtle Publications, 1989, Pages 244-256, including the use of rotating filter discs. The filter disc arrangements described by the author are complex and expensive to make and maintain. The same volume shows protein foam skimmers in pages 277-287.

Other aquarium filtration systems are shown in U. S. Pat. Nos. Des. 291,721, Des. 291,722, 4,483,769, and 4,512,885.

None of the preceding publications discloses the particular manner by which the present invention obtains biological and mechanical filtration in a single filtration system.

SUMMARY OF THE INVENTION

In this invention there are provided compact, efficient filtration systems for an aquarium utilizing in one embodiment a venturi powered protein skimmer and a mechanical filter.

Other embodiments include the use of an external protein skimmer to provide efficient removal of dissolved waste material.

Other objects and advantages of this invention will hereinafter become obvious from the following detailed description of preferred embodiments of this invention.

BRIEF DESCRIPTION OF THE FIGURES

FIG. 3 is a view partially cut away taken along 3—3 of FIG. 2. FIG. 4 is a view partially cut away taken along 4—4 of FIG. 1.

FIG. 5 is a view partially cut away taken along 5—5 of FIG. 2.

DETAILED DESCRIPTION OF THE PREFERRED EMBODIMENTS

Figure 6:
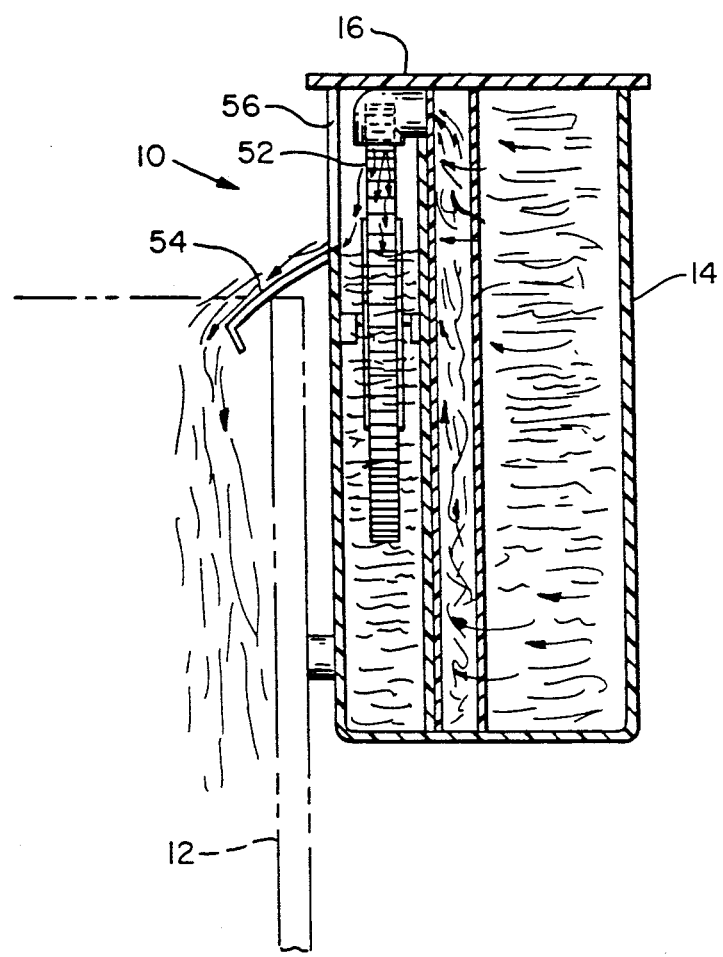
FIG. 6 is a section view taken along 6—6 of FIG. 1.

Referring to FIGS. 1-6, there is illustrated an aquarium filtration apparatus 10 suspended on a side wall of aquarium 12 (see FIG. 6).

Apparatus 10 comprises a tank 14 with a cover 16 containing adjacent the bottom thereof an electric pump motor assembly 18 with an electric wire 22 for providing power as seen in FIG. 5.

Figure 1:
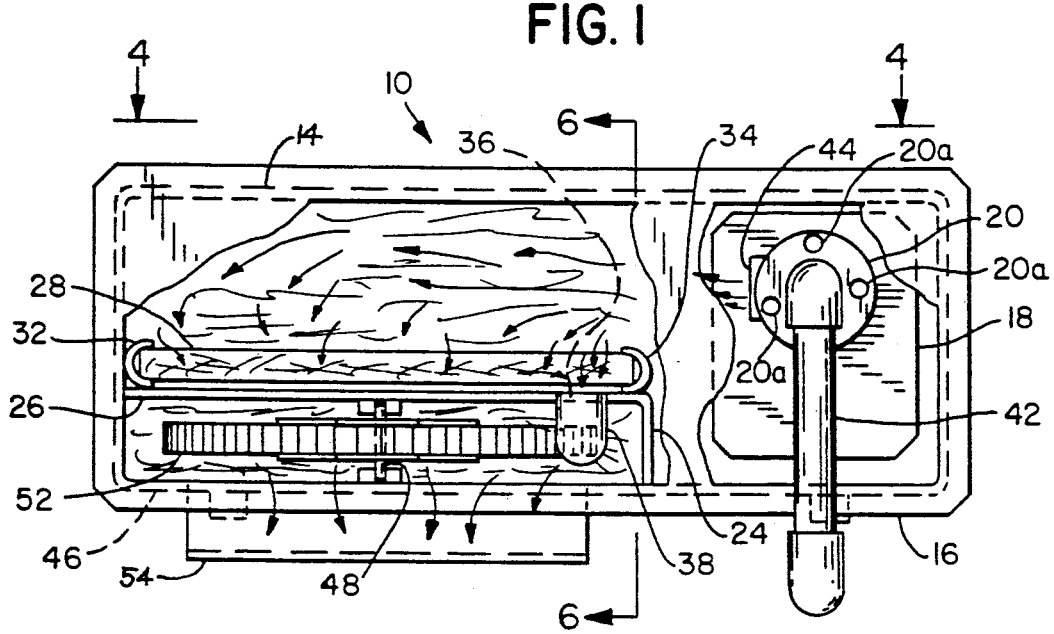
FIG. 1 is a top view partially cut away of a preferred embodiment of this invention.

The interior of tank 14 is divided by an L-shaped partition 24 into a sealed pressurized compartment outside of partition 24 containing pump motor assembly 18 and pump or impeller 20 and an open ambient pressure compartment within partition 24 as best seen in FIG. 1.

On the outside of wall 26 of partition 24 is mounted a mechanical filter 28 supported suitably by a pair of vertical tracks 32 and 34 for ease of replacement when cover 16 of tank 14 is removed. Filter 28 is spaced from wall 26 as is seen in FIG. 1. Cover 16 in place with "O" ring seals the pressurized compartment outside of partition 24.

Adjacent the top of tank 14 is provided an opening 36 through wall 26 and mounted on the unpressurized side of wall 26 is a nozzle 38 to direct flow of water downwardly for a purpose to be described.

Intake water from within aquarium 12 to pump assembly 18 is by way of an intake tube 42 which rises to pass through cover 16, horizontally to a point over aquarium 12 and then down to terminate near the bottom of aquarium 12. An "O" ring seal, not shown, may be employed to prevent water leakage.

Pump or impeller 20 is provided with an outlet opening 44 for the discharge of aquarium water under pressure resulting in the pressurization of the compartment outside of partition 24 in tank 14 becoming filled with such water. With cover 16 in place and the walls of partition sealed against cover 16, this region becomes slightly pressurized.

Impeller 20 connected to outlet opening 44 is provided with priming holes 20a on its top portion or on the diameter of the intake to act to prime the pump within. Holes 20a hasten the removal of air in the intake tube 42 but do not contribute significantly to the recirculation of water within the pump as do large vertical openings found in other designs.

The aquarium water leaves the pressurized compartment of tank 14 by passing through filter 28 where the particulate is trapped and out through opening 36 and nozzle 38.

Within the unpressurized or ambient pressure compartment of tank 14, within partition 24, there is mounted between wall 26 of partition 24 and side wall 46 of tank 14 a shaft 48 on which is mounted for rotation a wheel 52, Wheel 52 is porous and constructed from an inert material such as woven or threaded polyester material to provide as much surface area as possible for the bacteria to grow. The wheel and its associated brackets are removable to accomodate the protein skimmer embodiment.

Figure 2:
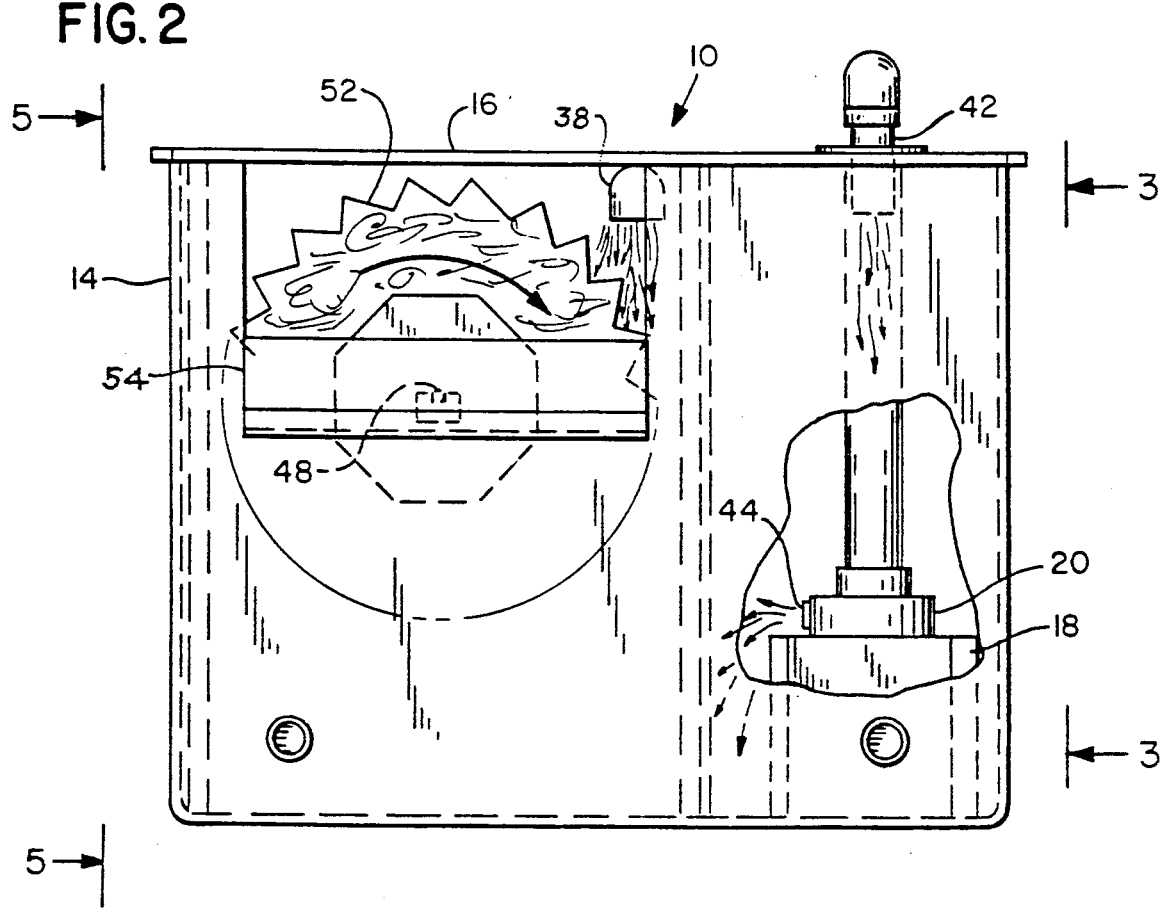
FIG. 2 is a front elevation view partially cut away of the embodiment shown in FIG. 1.

The circumference of wheel 52 is toothed as shown in FIG. 2 so that the aquarium water jetting from nozzle 38 will rotate wheel 52 as shown by the arrow in FIG. 2. In this way, the surface areas within wheel 52 are alternately submerged and exposed to the air.

Tank 14 is provided with a spillway 54 which not only supports tank 14 on a side wall of aquarium 12 but also directs the water which has filled the unpressurized compartment of tank 14 to return to aquarium 12 as seen in FIG. 6, opening 56 in the side wall of tank 14 being provided for this purpose.

In the operation of the apparatus just described, tank 14 is mounted as illustrated on the side wall of aquarium 12 with the spillway 54 disposed over the top of the aquarium side wall. Intake pipe 42 extends down into aquarium 12, and electric wire 22 is plugged into any 110 volt outlet.

Pump motor assembly 18 draws in water through inlet pipe 42 and delivers water under pressure through outlet opening 44 into the pressurized compartment of tank 14. When this compartment fills up, the water passing through filter 28 passes through opening 36 into nozzle 38. The pressurization insures that more of the water will pass through a greater portion of filter 28, whereas if tank 14 were open at the top much of the water would pass over the top of filter 28 when filter 28 becomes dirty.

The water jetting from nozzle 38 rotates wheel 52 which functions as a biological filter as described above. The unpressurized compartment containing wheel 52 fills up and when the level reaches opening 56 into spillway 54, the water returns to aquarium.

Figure 9:
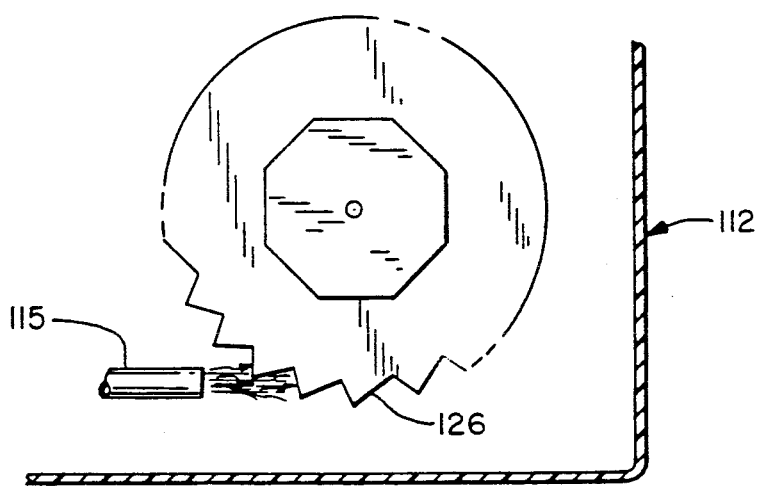
FIG. 9 is a detail view taken along 9—9 of FIG. 8.
Figure 7:
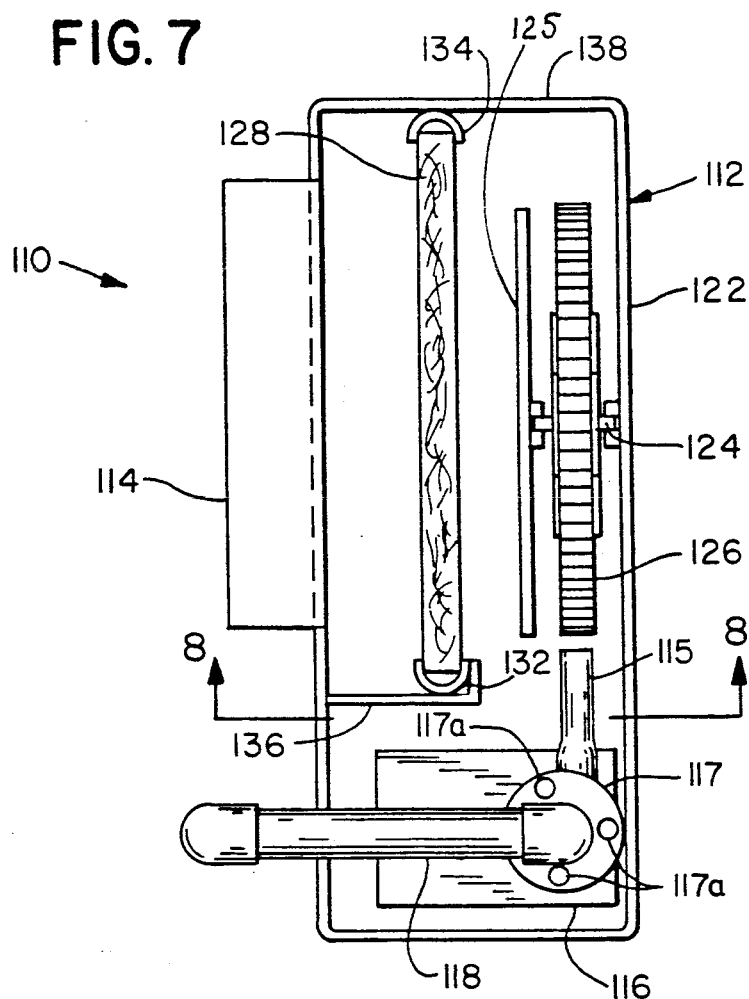
FIG. 7 is a top view with the cover removed of an alternative embodiment of this invention.
Figure 8:
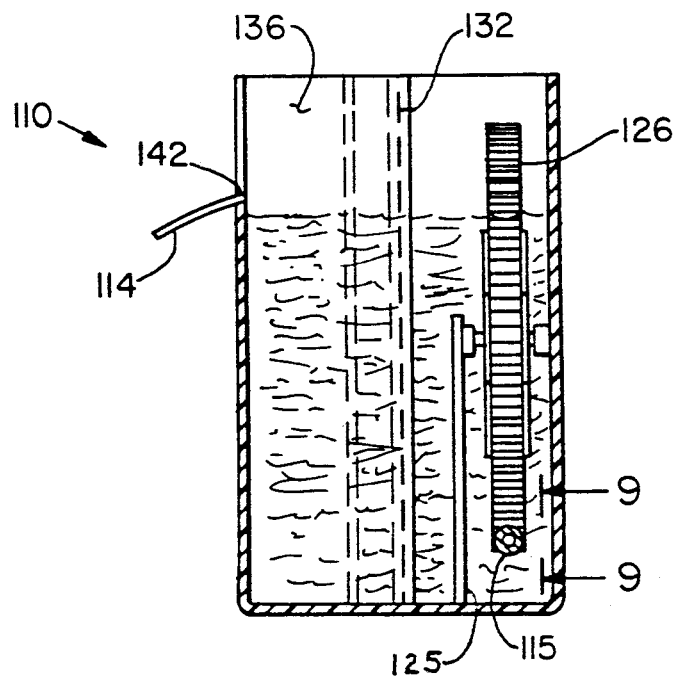
FIG. 8 is a section view taken along 8—8 of FIG. 7.

A variety of configurations embodying the principles of this invention are possible. For example, another embodiment of the invention is shown in FIGS. 7, 8, and 9. Illustrated is filtration apparatus 110 comprising a tank 112 with a spillway 114 which would be mounted on the outside of an aquarium (not shown) in the same manner previously described. In this embodiment, pump motor assembly 116 is mounted on the bottom of tank 112 with a nozzle 115 attached to the outlet of pump or impeller housing 117 with priming holes 117a for a purpose previously described. Inlet pipe 118 similar to what has been previously described draws water from within the aquarium for delivery to the intake side of pump motor assembly 116.

Mounted in tank 112 is a bearing bracket 125 which is removable. Wheel 126 and wheel shaft 124 are supported on both sides by bearing bracket 125. Wheel 126 and wheel shaft 124 are similar to wheel 52 previously described. It will be seen that nozzle 115 directs water to the bottom of wheel 126 completely submerged causing wheel 52 to rotate.

Tank 112 is completely unpressurized with a mechanical filter 128 mounted between two tracks 132 and 134. Track 132 is supported on the end of a wall 136 which blocks water flow except through filter 128, and track 134 is supported by wall 138 of tank 112.

The location of spillway 114 with its associated opening 142 into tank 112 establishes the level of water within tank 112 leaving wheel 126 to rotate in and out of the water as previously described.

In the operation of the apparatus just described, the water from pump or impeller 117 drives wheel 126 and the water is returned to the aquarium through filter 128 and over spillway 114. It should be noted in this arrangement the water is filtered mechanically after the biological filtration, whereas in the previous embodiment mechanical filtration occurred first.

The arrangement shown in FIGS. 7-9 is a simple and very economic design suitable for application in almost any aquarium design, and is very effective. This arrangement can be modified to form a very effective protein foam skimmer, such a system being shown in FIGS. 10 and 11.

Protein foam skimming, technically known as adsorptive separation or foam fractionation, removes dissolved organic waste material from the aquarium water by generating a foam which is rich in such contaminants. If small bubbles are generated from the water in the aquarium, many of these undesirable waste products will concentrate on the bubble surfaces. This foam contains water soluble proteins, amino acids, some organic dyes, fatty acids, fats, carbohydrates, tiny cells of algae, protozoa, bacteria and tiny buoyant particles of organic detritus, as well as other undesirable waste products in solution which can not be removed by mechanical filtration.

To make protein foam skimming work effectively in an aquarium to remove these contaminants, it is necessary to produce a very small bubble size (i.e., of the order of 0.5 to 1.00 mm.), have adequate but not excessive air flow, and sufficient contact time to produce a dry foam which is separated out. If the foam being removed is wet, that is, has a high content of water then the system is inefficient because too much of the water in the acquarium is lost and must be replaced.

Figure 10:
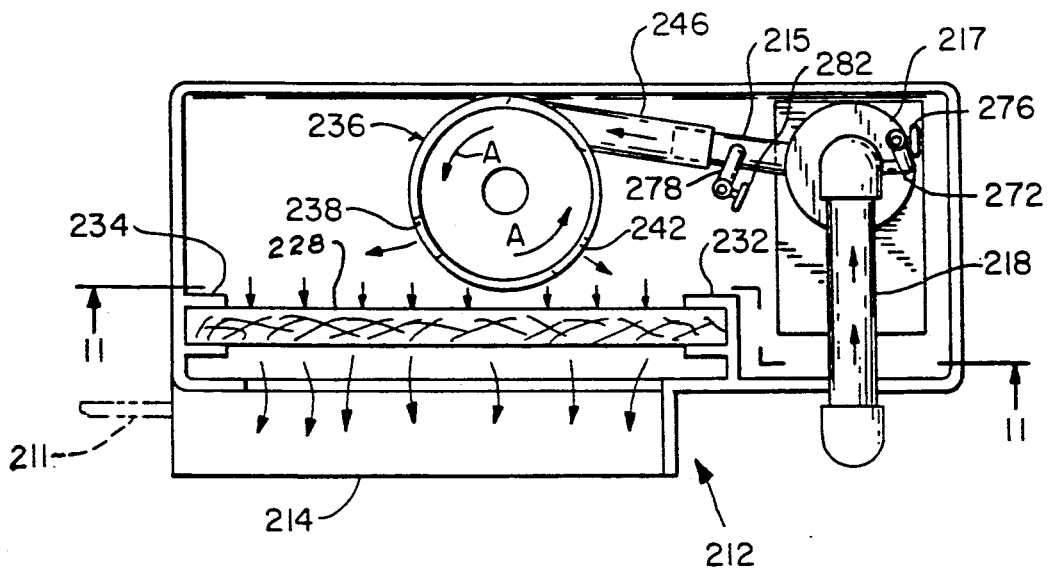
FIG. 10 is a top view with the cover removed of another embodiment utilizing adsorption foam separation in combination with mechanical filtration.
Figure 11:
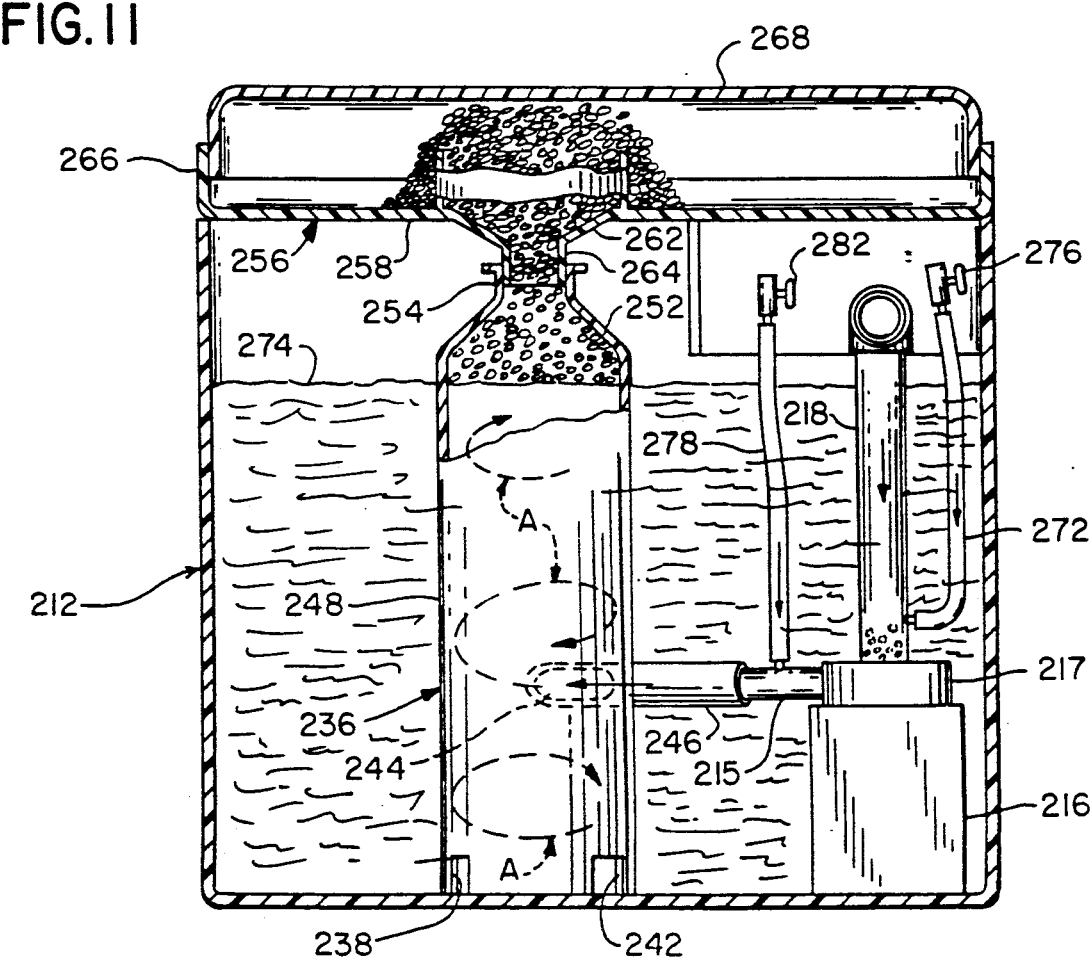
FIG. 11 is a view along 11—11 of FIG. 10.

In the arrangement shown in FIGS. 10 and 11, tank 212 is mounting on the side of the aquarium 211 and is similar in construction to the tank shown in FIGS. 7, 8 and 9 except for the differences to be described. FIG. 10, which corresponds to FIG. 7, shows tank 212 with a spillway 214 mounted on the outside of aquarium 211 in the same manner as previously described.

Pump motor assembly 216 with pump or impeller 217 is mounted on the bottom of tank 212 with a nozzle 215 attached to the outlet of pump or impeller 217. Inlet pipe 218 similar to what has been previously described draws water from within the aquarium for delivery to the intake side of pump motor assembly 216.

Tank 212 is completely unpressurized with a mechanical filter 228 mounted between two tracks 232 and 234, in a manner similar to that previously described.

Mounted within tank 212 is a vertically standing hollow cylindrical foam generator 236 having a pair of openings 238 and 242 at the bottom and an opening 244 at some intermediate point so as to receive the water from impeller 217 through nozzle 215 and an inlet pipe 246 which is directed tangentially to cause swirling within generator 236 as shown by arrows A.

Foam generator 236 consists of a cylindrical tank 248 terminating at the top through a converging section 252 into a flanged opening 254. A removable assembly 256 consisting of a basin 258 having built in a funnel 262 sits on the top of tank 212 with the bottom 264 of funnel 262 sitting in opening 254 as illustrated. The foam which is generated in the manner to be described below flows over the top of funnel 262 and collects in basin 258 which has an annular side wall 266 to contain the foam. A removable cover 268 may be utilized to improve the appearance of the apparatus.

Air to the system is supplied by way of an air inlet hose 272 which at the bottom enters water inlet pipe at the suction side of impeller 217. Hose 272 rises vertically to a point above water level 274 established by spillway 214. A valve 276 is adjustable so as to control the amount of air being sucked into impeller 217. Excessive air flow will produce wet foam and can stall the pump. Air flow is reduced to the point where the foam is dry, that is, no water other than that in the bubbles themselves will flow into basin 258.

If desired, air to the system can be supplied downstream of impeller 217 which can be employed with or instead of hose 272. Hose 278 with valve 282 operates by venturi effect. The advantage of this arrangement is it cannot stall the pump. The disadvantage is the bubble size is not as fine as that obtained by suction side air insertion.

In the operation of the system shown in FIGS. 10 and 11, most of the water entering foam generator 236 returns to the tank and hence to the aquarium by way of openings 238, 242 and spillway 214 after passing through mechanical filter 228. At the same time the turbulence developed within cylindrical vessel 248 as seen by arrows A in the presence of the air which rises toward the top produces above the water level a foam. As more foam is generated, it pushes out foam over the top of funnel 262 into basin 258 for collection. Air flow is adjusted by valve 276 and/or valve 282 to obtain the dry foam desired.

The arrangement shown in FIGS. 10 and 11 combines mechanical filtration and adsorptive foam separation in a single filter system for a home aquarium, providing the benefits and advantages of both in a compact and economical arrangement.

Figure 12:
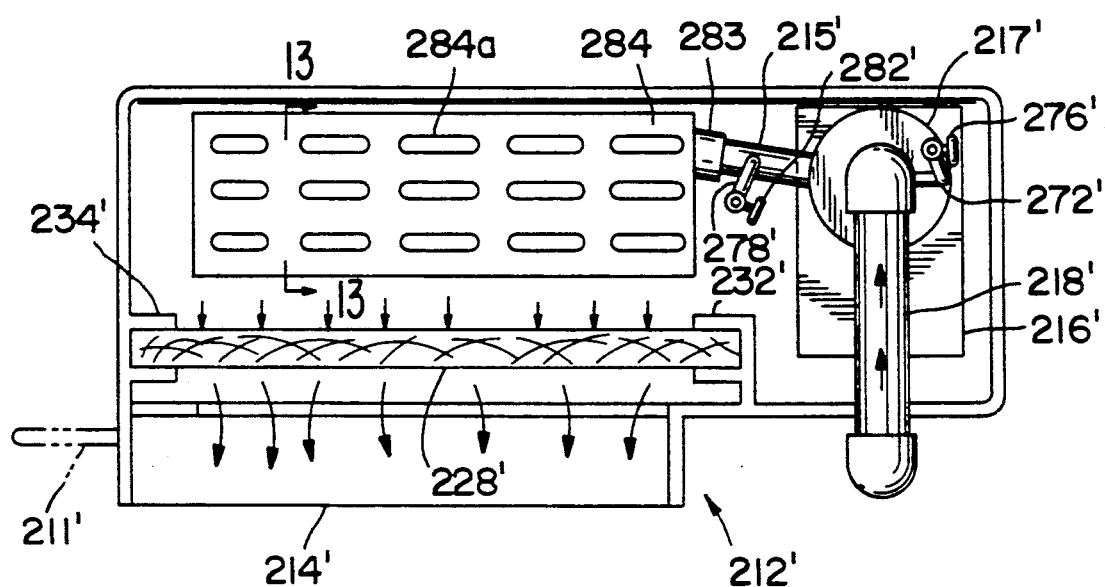
FIG. 12 is a view similar to FIG. 10 showing another embodiment of this invention.
Figure 13:
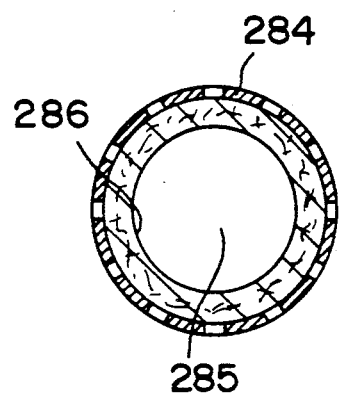
FIG. 13 is a section view along 13—13 of FIG. 12.

Another variation of the arrangement shown in FIGS. 10-11 is shown in FIGS. 12 and 13 which provides two stage filtration incorporating a pressurized canister filter where the bio-wheel or foam fractionizer is removed from the first region of the tank and in its place a closed canister filter 284 such as shown in FIG. 12 along with aeration within tank 212' having a spillway 214'. This canister 284 is an easily removed unit which can be either cleaned or replaced when dirty. Canister 284 is cylindrical with openings 284a and is connected to the pump nozzle 215'. All water from pump 217' is forced through the inlet 283 of canister 284 and into a plenum 285 comprising the inside of the canister filter 286.

Cylindrical filter 286 of open cell foam or other filter media surrounds plenum 285. The water is forced through filter 286 trapping the particulate inside the plenum and filter. After moving through this filter the water goes through the second filter 228' which would be used as a biological or chemical filter.

Air can be mixed in the pump housing using inlet hose 272' and valve 276' and/or hose 278' with valve 282' as in the embodiment of FIGS. 10-11. This will cause additional aeration of the water which is needed by the aerobic bacteria which live in open cell filter 286. Inlet pipe 218' similar to what has been previously described draws water from within the aquarium for delivery to the intake side of pump motor assembly 216'.

It should be noted that in this embodiment there is no wet dry portion of the filter, however, some biological filtration will take place because air is being mixed with water in the pump. One advantage of this embodiment is the ease of changing the canister compared to the first embodiment where a sealed cover must be removed and replaced.

Another advantage is that filter canister 284 does not have to be changed as often. Pressurization of the water permits filter 286 to be dirtier before it is necessary to replace it.

While only certain preferred embodiments of this invention have been described it is understood that many variations are possible without departing from the principles of this invention as defined in the claims which follow.

What is claimed is:

1. In combination with an aquarium, a filter assembly comprising:
   a. a tank having means to support said tank on a wall of said aquarium;
   b. said tank having a partition dividing the interior of said tank into first and second separate regions;
   c. adsorptive foam generation means mounted within the first region of said tank for generating a foam rich in dissolved wastes;
   d. pump means within said first region for drawing in water from said aquarium for filtration, first air feed means to feed air into said water for mixing said air with said water and feeding said water mixed with air into the suction side of said pump means, and then pumping said water into said foam generation means, said first air feed means including means to adjust the volume of air entering said water to control the degree of wetness and second air feed means to feed said air into said water n the outlet side of said pump means;
   e. an opening in said partition for providing communication between said regions;
   f. mechanical filter means mounted within and filling said opening so that water passing from the first region to the second region through said opening passes through said filter means for trapping particulate within aid water;
   g. said support means comprising a spillway for returning water in said second region to said aquarium, the wall of said tank having an opening adjacent said spillway having an outlet leading to said spillway, said outlet establishing the level of water within both said regions;
   h. said foam generation means including means to direct some of the water received from said pump means outside of said generation means into said first region and through said filter means to said second region for returning to said aquarium after being filtered and to produce a foam out of the remainder of the water received from said pump means, said generation means also including means for extracting said foam rich in waste products from said tank for disposal, said extracting means comprising an opening in said vessel out of which said foam flows, said tank including basin means to collect said form; and
   i. said generation means comprising a vertically extending hollow cylindrical vessel in which water containing air from said pump means is injected tangentially at some point above the bottom of said vessel to produce turbulence within said vessel, said vessel having openings at the bottom for directing water into said first region outside of said vessel.

2. The combination of claim 1 wherein said second air feed means includes means to adjust the volume of air entering said water for controlling bubble size in said foam.

3. In combination with an aquarium, a filter assembly comprising:
   a. a tank having means to support said tank on a wall outside of said aquarium;
   b. said tank having a partition dividing the interior of said tank into first and second separate regions;
   c. adsorptive foam generation means mounted within the first region of said tank for generating a foam rich in dissolved wastes;

d. pump means within said first region for drawing in water from said aquarium for filtration, mixing air with said water, and then pumping said water mixed with air into said foam generation means;

e. an opening in said partition for providing communication between said regions;

f. mechanical filter means mounted within and filling said opening so that water passing from the first region to the second region through said opening passes through said filter means for trapping particulate within said water;

g. said support means comprising a spillway for returning water in said second region to said aquarium, the wall of said tank having an opening adjacent said spillway having an outlet leading to said spillway, said outlet establishing the level of water within both said regions;

h. said foam generation means including means to direct some of the water received from said pump means outside of said generation means into said first region and through said filter means to said second region for returning to said aquarium after being filtered and to produce a foam out of the remainder of the water received from said pump means, said generation means also including means for extracting said foam rich in waste products from said tank for disposal and;

i. said generation means comprising a vertically extending hollow cylindrical vessel in which water containing air from said pump means is injected tangentially to produce turbulence within said vessel.

4. The combination of claim 3 wherein the water containing air is injected at some point above the bottom of said vessel, said vessel having openings at the bottom for directing water into said first region outside of said vessel.

5. The combination of claim 4 wherein the top of said vessel forms an opening out of which said foam flows out, said tank including basin means to collect said foam.

6. The combination of claim 5 having first air feed means to feed said air into said water on the suction side of said pump means.

7. The combination of claim 6 wherein said first air feed means includes means to adjust the volume of air entering said water to control the degree of wetness of said foam.

* * * * *